United States Patent [19]

Pesci

[11] Patent Number: 5,195,905
[45] Date of Patent: Mar. 23, 1993

[54] CONNECTING DEVICE

[75] Inventor: Marcello Pesci, Echandens, Switzerland

[73] Assignee: Interlemo Holding S.A., Switzerland

[21] Appl. No.: 791,452

[22] Filed: Nov. 13, 1991

[30] Foreign Application Priority Data

Apr. 23, 1991 [CH] Switzerland .................. 01207/91

[51] Int. Cl.$^5$ .................................. H01R 13/627
[52] U.S. Cl. .................................. 439/352; 439/350; 285/309
[58] Field of Search ............... 439/345, 350, 351, 352, 439/353, 354, 357, 358; 403/322; 285/92, 309, 313, 314, 315, 319

[56] References Cited

U.S. PATENT DOCUMENTS

| | | | |
|---|---|---|---|
| 2,528,369 | 10/1950 | Jensen | 285/309 X |
| 3,176,259 | 3/1965 | Macnamara | 439/357 X |
| 3,594,694 | 7/1971 | Clark | 439/350 X |
| 3,639,890 | 2/1972 | Stevens et al. | 439/352 |
| 4,265,503 | 5/1981 | Baur | 439/352 X |
| 4,545,633 | 10/1985 | McGeary | 439/352 X |

FOREIGN PATENT DOCUMENTS

| | | |
|---|---|---|
| 0141958 | 5/1985 | European Pat. Off. . |
| 1515712 | 3/1972 | Fed. Rep. of Germany . |
| 2159701 | 5/1973 | France . |
| 2191301 | 2/1974 | France . |
| 2462797 | 2/1981 | France . |

*Primary Examiner*—Larry I. Schwartz
*Assistant Examiner*—Khiem Nguyen
*Attorney, Agent, or Firm*—Anthony J. Casella; Gerald E. Hespos

[57] ABSTRACT

A connecting device includes a first body (1) and a second body (2) which are automatically lockingly engageably with one another. Elastic tongues (6) with stop dogs (7) are associated with the second body (2), and a groove (4) on the first body (1) is engaged by the stop dogs (7). A chuck (16) with a frustoconical cam (25) maintains the stop dogs (7) in the groove (4) and connects axially by a resilient split washer (19) to the second body (2). A manual unlocking ring (27) is mounted for axial movement on the chuck (16) to release the stop dogs (7) from the groove (4). A nut (29) engaged on a thread (28) of the first body (1) makes it possible to block the stop dogs (7) in the groove (4) and to immobilize the unlocking ring (27) by clamping against the chuck (16), so as to prevent any unintentional, accidental or improper unlocking.

3 Claims, 1 Drawing Sheet

CONNECTING DEVICE

BACKGROUND OF THE INVENTION

The present invention relates to a connecting device having two tubular bodies, each of which is intended to be connected to a conductor for the transmission of electric, photonic or fluidic signals. The tubular bodies are to be engaged one within the other and temporarily disengaged from each other manually. The device comprises automatic engagement locking means and manual disengagement unlocking means.

Devices of this type are known and universally employed in various fields of industry in which very high precision and reliability are required, particularly in the fields of telecommunication and aerospace.

The automatic locking and manual unlocking means of such devices are of different types, depending on the manufacturer and the options selected.

Among these different types of prior art locking and unlocking means, there is one, to which the invention refers. These locking and unlocking means are formed by peripheral elastic tongues having protruding stop dogs associated with one of the two bodies. A peripheral groove for the automatic elastic engagement of said stop dogs which is associated with the other body. A manual unlocking ring acts by axial displacement to release the stop dogs from the groove.

With the prior art connecting devices comprising these locking and unlocking means, the introduction and manual pushing of one body into the other has the effect of internally connecting the signal conductors, and moving the stop dogs apart until they align with the groove. The stop dogs then automatically penetrate the groove due to the inherent elasticity of the tongues which bear them. Thereupon, the locking of the connection is effected by retaining these stop dogs against any pull on the conductors or the bodies that would tend to move the bodies apart.

For the intentional release of one body from the other, it is necessary to pull on the unlocking ring. The unlocking ring is associated with means generally formed of a cam and a release space, which have the effect of moving the stop dogs associated with one body out of the groove associated with the other body.

One known connecting device of this type is described in U.S. Pat. No. 3,160,457. In that device, the locking ring is mounted for axial sliding on the outer wall of one of the two bodies and has elastic tongues with stop dogs. These tongues extend over the periphery of the end of the body, providing a release space between the tongues and the outer wall. The other body has a peripheral inner groove in which the stop dogs engage upon the introduction of the other body. A frustoconical cam terminates the body bearing the locking ring in front of the stop dogs to prevent the stop dogs from disengaging from the groove when the conductors or bodies are subjected to a pull tending to separate them. Only a pull on the unlocking ring makes it possible to free the stop dogs from the groove by their withdrawal into the release space provided for this purpose. The automatic locking and manual unlocking system of these known connecting devices is satisfactory. The known system makes it possible to connect the signal conductors rapidly, and the locking which it effects is reliable.

However, the fact that these prior art connecting devices can be unlocked by a simple pull on the unlocking ring constitutes a risk of accidental unlocking, followed by disconnection. For example, accidental disconnection may occur upon unskillful manipulations during mounting or replacing a neighboring connector on a board having a multi-connector assembly in which a plurality of connectors of this type are fastened very close to each other.

OBJECT AND SUMMARY OF THE INVENTION

The object of the invention is to avoid accidental disconnection in a simple and advantageous manner.

For this purpose, the connecting device of the invention, which is of the type described at the beginning hereof, is characterized by the fact that the engagement groove for the stop dogs is located on the outer wall of one of the two bodies. Elastic tongues with stop dogs are borne by a cylindrical sleeve which slides axially on a limited portion of the other body. The cylindrical sleeve has a radial wall having at least two diametrically opposite openings. A cylindrical chuck is arranged, in radial direction, between the elastic tongues and the unlocking ring. One side of the chuck has at least two extension arms passing through the two openings of the sleeve and means for connection to the body bearing the tongues. The other side of the cylindrical chuck has a front resting face and a peripheral axial retention collar. A frustoconical inner cam surface between the two sides of the chuck retains the stop dogs in the groove, and a chamber permits release of the stop dogs from the groove by relative axial displacement of the sleeve. An unlocking ring is mounted for sliding on the cylindrical chuck between the peripheral collar thereof and the radial wall of the cylindrical sleeve over a distance sufficient to permit the release of the stop dogs in the chamber of the chuck by axial push against the radial wall of the sleeve. The body bearing the groove for the engagement of the stop dogs has, at its rear, a threaded portion on which there is engaged a nut located facing the front resting surface of the cylindrical chuck.

In this way, by screwing the nut on the threaded part of the body that bears the engagement groove for the stop dogs and firmly tightening the nut against the front face of the cylindrical chuck, the frustoconical inner cam surface of the chuck firmly holds the stop dogs in the groove by wedge effect. By simultaneous effect, the unlocking ring is immobilized between the peripheral collar of the chuck and the radial wall of the cylindrical sleeve which bears the elastic tongues and the stop dogs. This eliminates any possibility of unlocking and disengagement of the two bodies of the connecting device. The chuck in question is connected axially to the body bearing said elastic tongues having the stop dogs. The blocking of the connection is thus assured regardless of any lack of skill or improper maneuver from the time of the tightening of the nut.

Thus, in a simple and economical manner, the purpose of the invention is achieved essentially from the design and special spatial arrangement of the elements bearing the elastic tongues having the stop dogs, the groove, the frustoconical cam surface, the release chamber and the unlocking ring. These elements include: the cylindrical sleeve bearing the elastic tongues with stop dogs; and the cylindrical chuck which penetrates into the cylindrical sleeve and bears on the inside the cam and the chamber, and on the outside, the unlocking ring between its collar and the radial face of the cylindrical sleeve.

The particular design and arrangement make it possible, in fact, to release the front face of the chuck on the side of the body bearing the groove and thus make it possible to block the unlocking system by a single nut.

BRIEF DESCRIPTION OF THE DRAWINGS

The accompanying drawing shows, by way of illustration, one embodiment of the invention, this embodiment furthermore showing other advantages made possible by its basic design.

DETAILED DESCRIPTION OF THE PREFERRED EMBODIMENT

Figure 1:
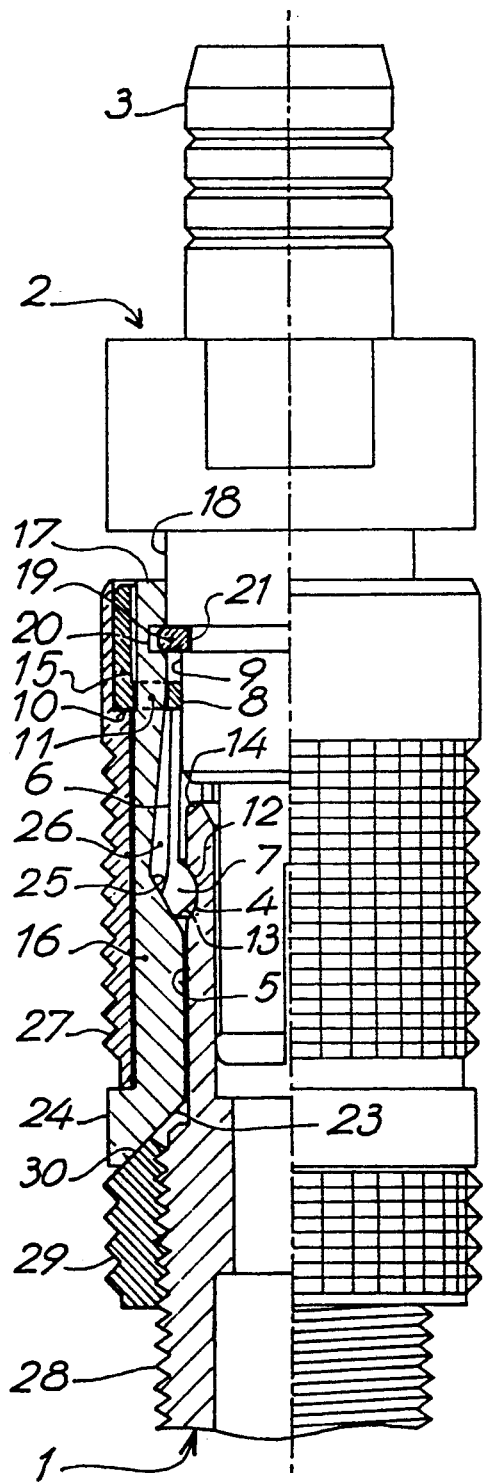
FIG. 1 of the drawing is a half outside view and half axial section of the assembly, shown in blocked locking position.

The connecting device shown comprises two tubular bodies 1 and 2, each intended to be connected by a nipple 3, only that of the body 2 being shown, to a conductor for the transmission of electric, photonic or fluidic signals.

The connecting mean of the signal conductors located within these two tubular bodies have not been shown for reasons of clarity of the drawing.

The locking and unlocking means of the two bodies is described below.

A circular groove 4 is provided on the outer wall 5 of the engagement end of the body 1, and has a cross section in the shape of a circular arc.

Elastic tongues 6 with end stop dogs 7 (in this case eight in number, as can be noted from FIG. 3) are borne by a cylindrical sleeve 8 sliding axially on a cylindrical surface 9 of the other body 2. The sleeve 8 has a radial wall 10 of larger diameter with diametrically opposite circular openings 11 (in this case two in number) which are clearly visible in FIG. 3. The cross section of the stop dogs 7 has a part 12 in the form of a circular arc intended to engage the groove 4 of the body 1 and an inclined straight part 13 intended to facilitate the engagement of the end 14 of the body 1 below the stop dogs 7 and to cause the elastic lifting of the stop dogs 7 upon the introduction of the body 1 into the body 2. A cylindrical end part 15 completes the cylindrical sleeve 8 in its larger diameter radially above the level of the openings 11.

Figure 3:
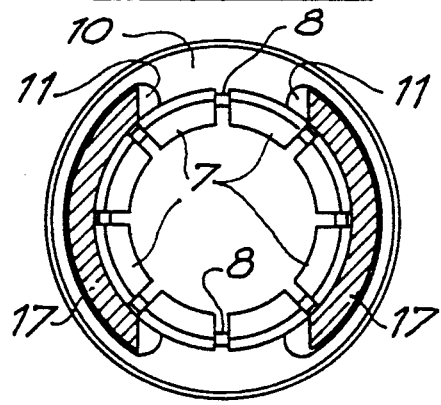
FIG. 3 is a front view of an element of this embodiment.

A cylindrical chuck 16 is arranged above the elastic tongues 6 having the stop dogs 7, and has, on the side of the body 2, diametrically opposite extension arms 17, here two in number, shown in cross section in FIG. 3. The extension arms pass through two radial openings 11 in the sleeve 8 and rest against a shoulder 18 of the body 2. This chuck 16 is connected axially, in front of the shoulder 18, by a circlip or resilient split washer 19 held with radial clearance in an inner groove 20 in the extension arm 17 and which is held in a corresponding outer groove 21 in the cylindrical surface 9. On the side of the body 1, this chuck 16 has a tubular part surrounding the wall 5 of this body, a frustoconical front resting face 23 and a peripheral radial retaining collar 24. Between these two sides, the chuck 16 has a frustoconical inner cam surface 25 flared towards the elastic tongues 6, followed by a chamber 26 which is also frustoconical, but is flared in the opposite direction. The cam surface 25 and chamber 26 are provided to retain the stop dogs 7 in the groove 12 and to permit their release from the groove 12 by relative axial displacement of the sleeve 8 respectively.

An unlocking ring 27, notched to facilitate the grasping thereof, is slidably mounted on the chuck 16 between the peripheral collar thereof and the radial wall 10 of the sleeve 8 over a distance sufficient to permit the release of the stop dogs 7 in the chamber 26 by axial thrust against the radial wall 10.

A threaded portion 28 is defined on the body 1 to the rear of the groove 4 for the engagement of the stop dogs, and is engaged a nut 29 facing the front frustoconical resting surface 23 of the chuck 16. The nut 29 also has a corresponding frustoconical face 30 of the same concavity as well as a notching in order to facilitate the grasping thereof.

From FIG. 1, which shows this connecting device in blocking position, it is clearly evident, as already described in the paragraph concerning the effects of the invention, that any pull tending to separate these two bodies 1 and 2 cannot be successful, whether this pull is applied, for instance, on the body 2 or on the unlocking ring 17.

When applied to the body 2, the pulling force is transmitted, by means of the axial connection of the resilient split washer 19, to the chuck 16 and its frustoconical cam 25, which has the effect of increasing the pressure of the stop dogs 7 in the groove 4 of the body 2.

It should be noted here—and this is important in view of the advantages of the invention—that this locking effect of the engagement of the stop dogs 7 in the groove 4 takes place also in the absence of the tightening of the nut 29 against the front resting surface of the mandrel 16 when the force is applied only to the body 2.

When applied to the unlocking ring 27, the pulling force is transmitted to the stop dogs 7 by the radial wall 10 of the sleeve 8, which has the effect of transmitting this force to both the groove 4 and the frustoconical cam 25 and to tend to free the dogs from said groove. By the retention of the nut 29 clamped against the front face 23 of the chuck 16, this tendency is made ineffectual, the stop dogs 7 being blocked in the groove 4 by the wedge effect of the frustoconical cam 25 pushed against them by this clamping.

Figure 2:
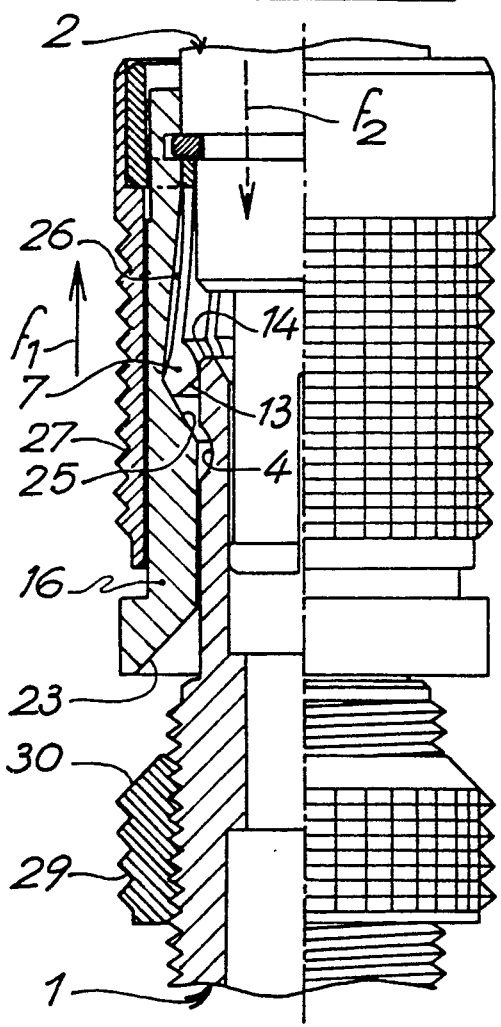
FIG. 2 is a half view, partial half-section shown in unlocking position.

After release of this blocking by the unscrewing of the nut 29, the unlocking can be effected by simple manual pull on the unlocking ring 27, as shown in FIG. 2.

In a first stage which precedes that illustrated in this FIG. 2 and which can be noted from FIG. 1 provided that the nut 29 is assumed loosened, the pulling force in the direction of the arrow $f_1$ applied to the unlocking ring 27 has the effect, due to the components of this force applied by the stop dogs 7 against both the frustoconical cam surface 25 and the groove 4, of carrying along the body 1 through said groove, even through only slightly, and thus permitting the stop dogs to rise on the frustoconical wall of said cam 25 finally to free themselves entirely in the chamber 26, releasing the body 1, in accordance with this FIG. 2.

This FIG. 2 also illustrates the phase of engagement of the two bodies 1 and 2, by direct push, in the direction of the arrow $f_2$, of the body 2 in the body 1 for instance, without requiring the actuation of the unlocking ring 27. In fact, upon this engagement, the end 14 of the body 1 comes against the inclined face 13 of the stop dogs 7, lifts them while pushing them into the chamber 26, and passes below them to the level of the groove 4 into which these dogs penetrate then by the inherent elasticity of the elastic tongues 6, thus assuring the automatic locking of the engagement.

In this embodiment, which is given by way of example, the resilient split washer 19, which assures the axial connection of the chuck 16 to the body 2, has the advantage of making this connection undetachable in the sense that, once engaged in the groove 21 of this body by push of the chuck 16, into the groove 20 of which it has been previously introduced, it is no longer possible to open it from the outside in order to dislodge it therefrom. The assembly consisting of chuck, elastic tongues with stop dogs and unlocking ring is thus sheltered from any risk of disconnection from the body 2.

However, it is obvious that any other means of connection can be employed, such as, for instance, by screwing the extension arms of the chuck on a threaded part of the body 2 and blocking them against a shoulder.

The respective frustoconical resting surfaces of the nut 29 and the chuck 16 also have the advantages of naturally tightening the blocking of the nut while avoiding the use of a lock washer which might be lost upon each disengagement of the connection. However, here also, this feature is not indispensable, in view of the object of the invention.

Finally, it is clear that the invention is applicable to all linear or 45° or 90° connection devices, whether free or secured by fastening of one of their two bodies to a board.

I claim:

1. A connecting device comprising:
a) a first tubular body for connection to a conductor to enable transmission of signals, said first tubular body having an outer wall and a peripheral groove thereon;
b) a second tubular body for connection to a conductor to enable transmission of signals, said second tubular body being dimensioned and configured for engagement over said first body;
c) cylindrical sleeve means mounted on said second tubular body for sliding axial movement over a limited portion thereof, said cylindrical sleeve means having:
  i) a plurality of peripheral resilient tongues each said tongue having a protruding stop dog disposed and dimensioned to penetrate into said peripheral groove upon engagement of said second tubular body over said first tubular body; and
  ii) a radial wall having at least two diametrically opposed openings;
d) a cylindrical chuck mounted over said resilient tongues, said cylindrical chuck having:
  i) first and second ends;
  ii) at least two extension arms at the first of said ends, said extension arms respectively passing through said openings of said cylindrical sleeve means;
  iii) means for axial engagement of said two arms with said second tubular body;
  iv) a front resting face and a peripheral axial retention collar at the second of said ends; and
  v) between said ends, inner frustoconical cam surface means for retaining said stop dogs in said peripheral groove, and inner chamber means between said cam surface means and the first of said ends for permitting release of said stop dogs from said groove upon relative axial displacement of said sleeve;
e) unlocking ring means mounted on said cylindrical chuck for sliding movement between said retention collar and said radial wall over a distance sufficient to permit release of the stop dogs into said chamber means by axially pushing against said radial wall;
f) a threaded portion on said first tubular body, behind said peripheral groove; and
g) nut means engaged said threaded portion for facing and engaging said front resting face of the cylindrical chuck.

2. A connecting device according to claim 1, wherein said means for axial engagement of the extension arms of the cylindrical chuck with said second tubular body comprises,
a) inner groove means in said extension arms;
b) a resilient split washer engaged with radial clearance within said inner groove means; and
c) outer groove means on said second tubular body for elastic engagement of said resilient split washer.

3. A connecting device according to claim 1, wherein said front resting face of the cylindrical chuck is frustoconical, and wherein said nut means for facing and engaging said front resting face is also frustoconical and of same conicity as said front resting face.

* * * * *